April 8, 1958 L. G. COPEMAN 2,829,815
COMPOSITE BOX
Filed Sept. 25, 1953 3 Sheets-Sheet 1
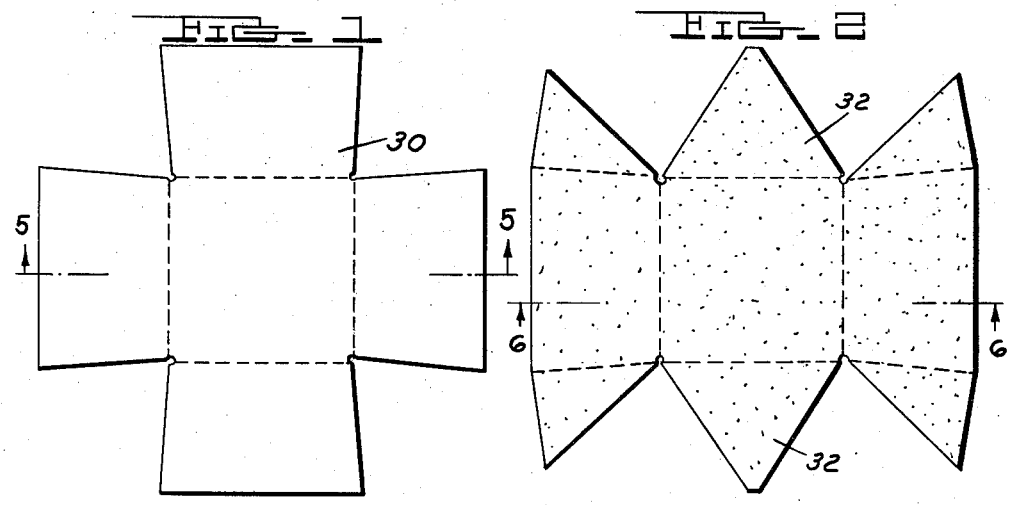
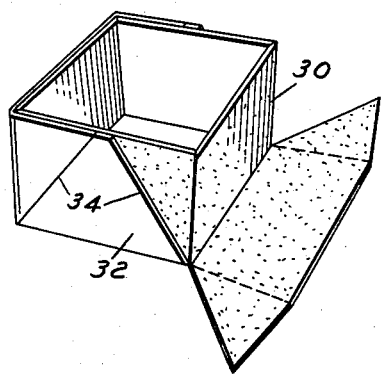
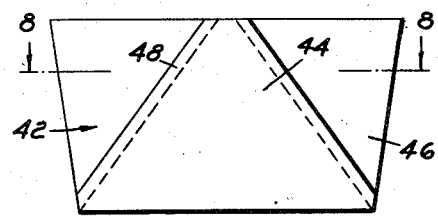
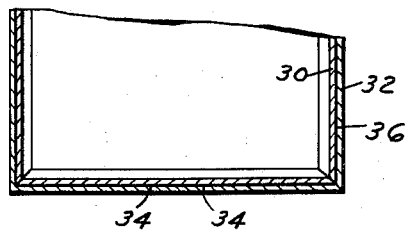
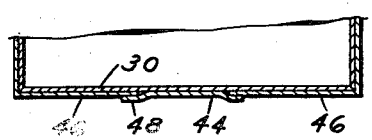
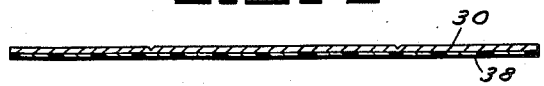
INVENTOR.
LLOYD G. COPEMAN
BY
ATTORNEYS April 8, 1958     L. G. COPEMAN     2,829,815
COMPOSITE BOX
Filed Sept. 25, 1953     3 Sheets-Sheet 2
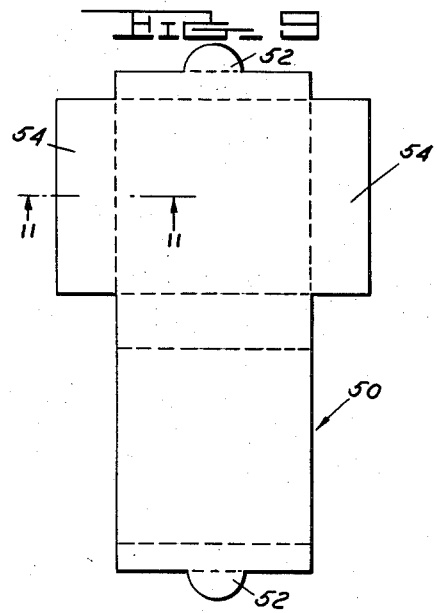
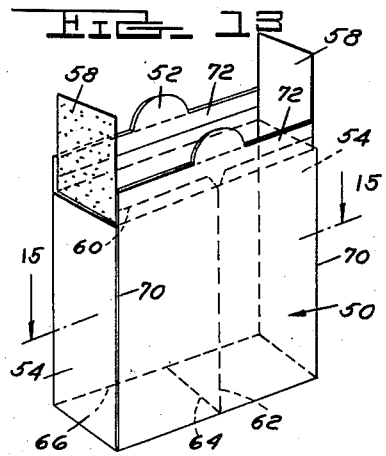
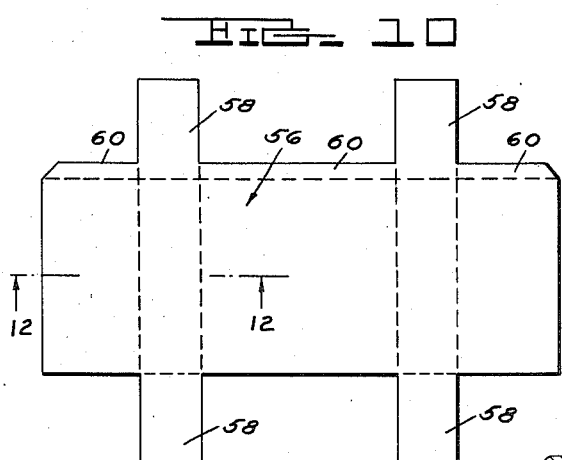
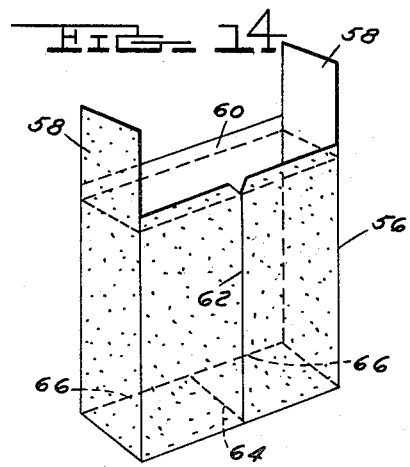
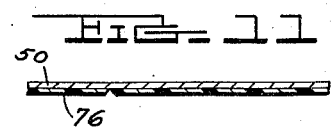
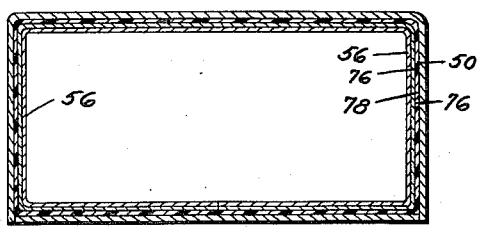
INVENTOR.
LLOYD G. COPEMAN
BY
Barnes, Kisselle, Laughlin & Raisch
ATTORNEYS April 8, 1958 L. G. COPEMAN 2,829,815
COMPOSITE BOX
Filed Sept. 25, 1953 3 Sheets-Sheet 3
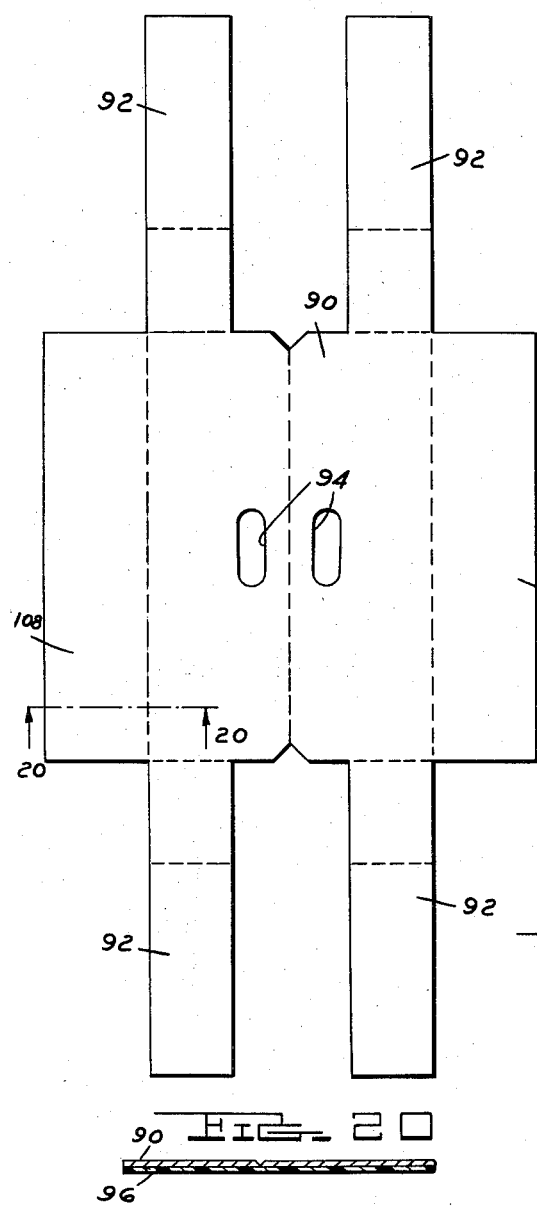
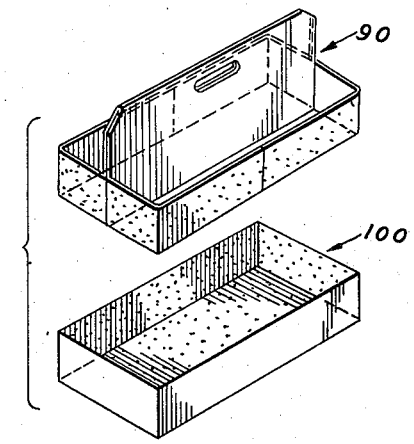
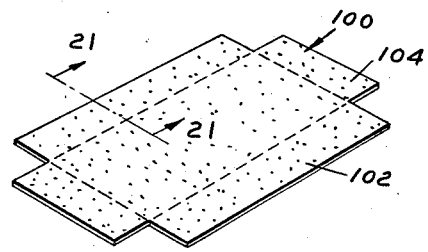
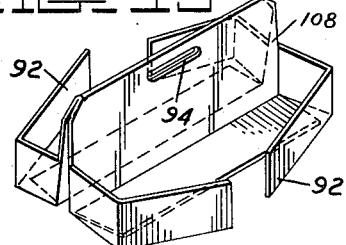
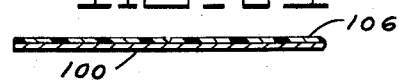
INVENTOR.
LLOYD G. COPEMAN
BY
Barnes, Kisselle, Laughlin & Raisch
ATTORNEYS

United States Patent Office 2,829,815
Patented Apr. 8, 1958

2,829,815

COMPOSITE BOX

Lloyd G. Copeman, Metamora, Mich., assignor to Copeman Laboratories Company, Flint, Mich., a corporation of Michigan Application September 25, 1953, Serial No. 382,440

1 Claim. (Cl. 229—23)

This invention relates to a box to be made up of preformed blanks which are subsequently laminated to provide a structurally stable container.

The box is especially adapted for use in food packaging, particularly fruit, berries, and vegetables, and is also adapted for use in hermetically sealed containers. The box construction is also adapted to modifications wherein unusual structural features can be embodied in a container.

It is an object to provide a box which can be made of varying types of material, such as water-proof material, for structural stability in all weather conditions and also adapted for use with materials which are critical for certain storage purposes. For example, in berry boxes and fruit containers it is many times important that the box be formed of absorbent material to soak up the juice of bruised fruit to prevent its spreading to the contents of the box. In addition to this requirement, it is essential that the box be weather-proof to some extent so that it will not disintegrate when wet. In other cases it may be desirable to have the inside of the box moisture-proof whereas the characteristics of the outside of the box are not critical.

Other requirements of boxes made up of fibrous material such as paper are structural strength, which in the present case can be furnished by the design of the box and the nature of its manufacture.

For example, the present invention contemplates laminated walls in a box, and the laminated material is intended to be mechanically bonded to the interstices and pores of the two bonded sheets whereby when the sheets are placed together they furnish mutual support in addition to providing a membrane between the sheets which is mechanically locked to each sheet and which provides a moisture-proof and, to some extent, rupture-proof wall.

Another object of the invention is the provision of a sealed box which is closed at all seams and corners by reason of the nature of the construction.

A further object is the provision of a box construction which can be formed of flat blanks transferable and ready for assembly in stacked condition.

Other objects and features of the invention relating to details of construction will be apparent in the following description and claim.

Drawings accompany the specification, and the various views thereof may be briefly described as follows:

Figure 1, a plan view of a box blank.

Figure 2, a plan view of a second box blank.

Figure 3, a perspective view showing the manner in which the box blanks are joined to form a complete unit.

Figure 4, a plan view of the assembled box.

Figures 5 and 6, sectional views on lines 5—5 and 6—6 of Figures 1 and 2, respectively.

Figure 7, a side elevation of a modified device showing a reinforcement construction.

Figure 8, a sectional view on line 8—8 of Figure 7.

Figure 9, a plan view of a blank for a modified sealing type box.

Figure 10, a view of a second blank for use in the sealing type box.

Figures 11 and 12, sectional views on lines 11—11 and 12—12 of Figures 9 and 10, respectively.

Figure 13, a completed box with the blanks of Figures 9 and 10.

Figure 14, the inner blank.

Figure 15, a horizontal section on line 15—15 of Figure 13.

Figure 16, a blank of a modified box construction.

Figure 17, an assembly of the modified box of Figure 16.

Figure 18, a blank to be used with the assembly of Figure 17 as the outer unit.

Figure 19, the blank of Figure 16 folded ready for assembly.

Figures 20 and 21, sectional views taken on lines 20—20 and 21—21 of Figures 16 and 18, respectively.

Referring to the drawings, Figures 1 to 6 show blanks, assemblies and cross sections of the first embodiment. It will be seen that the blank 30 of Figure 1 forms the inside of a box. This blank is coated on one side with a sheet of rubber deposited from an aqueous dispersion usually referred to as "latex." The rubber is cured to the point that it is relatively non-tacky but still has a great coherence with a surface of a similar nature. In fact, the coherence is so great that once the opposed surfaces are joined they cannot be separated since they join to form a continuous sheet of rubber with no evidence of lamination.

The blank 32 shown in Figure 2 has a different configuration with triangular walls and gussets so that the seams of the side walls of the box will not overlap at any point but will join along a continuous wall of the adjacent box section. The top surface of the blank as shown in Figure 2 is covered with the latex coating as described in connection with Figure 1.

One of the objects of the invention is to provide a box which is stronger when formed of two layers of material than it would be if formed with a single sheet of material having the same thickness as the laminated box. The reason for this is that the coated surfaces of the blanks 30 and 32 are preferably slightly absorbent so that the latex enters the pores and keys into the surface.

When the boxes are joined as shown in Figure 3, the coherent surfaces of rubber are placed together and the walls are moved up to form a double thickness throughout. The edges of the outer surface of blank 32 abut as shown at 34. Once these blanks are pressed together to form the completed unit the mechanical strength which is imparted to the walls due to the now uniform layer of rubber which is keyed into the contacting surfaces has actually been found to be greater than when a single sheet of material of an equivalent thickness is used to form the box.

In section, as shown in Figures 4, 5 and 6, the continuous membrane that is formed between the blanks 30 and 32 is identified at 36. The individual membranes prior to joining are shown in section in Figures 5 and 6 at 38 and 40. In Figure 7 a modified construction is shown wherein an inner blank 30 is used as illustrated in Figure 1 and an outer blank 42 is cut so that the triangular end tabs 44 on opposite sides of the base fold up to overlap the triangular side wings 46, the overlap being shown at 48. The resilience of this overlapping strip 48 bearing against the triangular wings 46 adds a mechanical strength to these walls.

The boxes shown in Figures 1 to 8 are ideally suited for berry boxes, which must have an absorbent inner wall to soak up the juices from bruised berries, thus preventing the spoilage of other berries in the box. The present construction is ideal for this arrangement since the inner blank 30 can be readily formed of an absorbent material and the outer blank 32 can be formed with an outer surface which is weather resistant.

In addition, when the laminated box is completed the continuous membrane of rubber between the laminations also provides a weather seal which prevents destruction by moisture.

It will be seen that the blanks 30 and 32 can be shipped in the flat, each blank protecting the coated surface of an adjacent blank while the parts are stacked. The boxes can be actually formed on the field where they are being used; and should a sudden storm come up, they will not be subject to destruction by moisture.

A second embodiment of the invention is shown in Figures 9 to 15. The package thus shown is particularly adapted for shipping of food stuffs or drugs which are subject to damage by moisture, it being an object to provide a box which is hermetically sealed.

In Figure 9 an elongate, rectangular blank 50 is shown having end tabs 52 and side wings 54 adjacent one end. This blank 50 forms the outer covering of a box and the inner blank is shown in Figure 10 being primarily a rectangular sheet 56 having spaced, parallel tabs 58 on opposite sides and having one narrow strip 60 extending along one edge integrally joined with the tabs 58.

The inside blank 56 folds up as shown in Figure 14 with joining edges at 62 along one side and 64 and 66 at the bottom. The outer blank 50 folds up in a similar manner to the shape shown in Figure 13, where the sides 54 form the edges of the box and join with one wall at a corner seam 70.

It will thus be seen that the seams 62, 64 and 66 of the inner liner do not coincide at any point with the seams of the outer liner. The contacting walls of each of the blanks 50 and 56 are coated with an aqueous dispersion of rubber as previously described in connection with Figures 1 and 2 so that the walls are integrally joined by the cohering membranes of rubber.

The top of the box shown in Figure 13 can be sealed by folding in the flaps 58 and mitering the corners which are adjacent the small flap 60 as they fold in. The end flaps 72 are then folded over the flaps 58 and will seal these flaps over the center of the joined flaps 58. The semi-circular tabs 52 will join at the center of the package to provide a convenient tab for opening and also to seal the center portion of the box adjacent the point where the ends of the flaps 58 are joined. Thus, a hermetically sealed box is formed with all corners protected.

The inner liner may be formed of a foil of some kind but is preferably formed of some water-resistant material, such as foil, wax paper, or even a light plastic sheet which is laminated prior to forming with a sheet of paper, which is absorbent enough to receive a good coat of coherent latex.

In Figure 11 a sectional view of the outer blank shows the cardboard material 50 covered by an adhesive coating 76.

In Figure 12 a foil blank 56 is laminated with paper 78 and then coated on the paper side with the cohesive latex 80.

A third modification utilizing the general principles of this invention are shown in Figures 16 to 21. In Figure 16 an inner blank 90 is shown almost square in configuration having parallel end tabs 92 at each end and centrally being perforated to provide elongate holes 94. The lower surface of this blank 90 as viewed will be coated with latex 96 as shown in the sectional view of Figure 20.

The second blank for the combination is shown in Figure 18, it being a rectangular blank 100 with side tabs 102 and end tabs 104. The top surface of this blank 100 is coated with latex as shown in section at 106 in Figure 21. The inner blank is then formed as shown in Figure 19 so that portions 108 actually form the bottom with the intermediate portions rising vertically to provide a center partition and handle. The tabs 92 are bent around to form the sides, and the device is then insertable into a shallow box formed from the blank 100. All of the coated walls will be pressed together to form an extremely strong box with laminated bottom and side walls and a double center partition. This box can be used for a variety of purposes and has the same mechanical strength features as previously described in connection with the other modifications.

It will thus be seen that I have shown a box construction which permits the use of many different materials for the formation of utility boxes, depending on the particular needs. The construction also permits the use of relatively light material and still provides an extremely strong construction which is resistant to moisture destruction.

I claim:

A laminated wall container comprising a plurality of pre-cut blanks foldable to the shape of the final container, each blank having one side coated with a substantially continuous membrane of cohesive rubber, one of said blanks comprising a substantially H-shaped sheet foldable to a closed container having a center joint at the bottom and along one side, a second blank foldable to a container substantially the size of the first blank having edges joined at the ends of the bottom and the ends of one side, the edges of the inner container projecting slightly above the edges of the outer container and being foldable to close the container at the corners, the outer container having end flaps to cover the closure of the inner container, said blanks being placed together in folded form wherein the cohesive latex coatings are joined to form a continuous membrane lamination between the blanks to provide a hermetically sealed container.

References Cited in the file of this patent
UNITED STATES PATENTS

| | | |
|---|---|---|
| 299,777 | Gooding | June 3, 1884 |
| 1,411,510 | Peterson | Apr. 4, 1922 |
| 1,802,101 | Wood | Apr. 21, 1931 |
| 1,911,908 | Lell | May 30, 1933 |
| 2,175,731 | Palmer | Oct. 10, 1939 |